United States Patent [19]

Wolff

[11] 4,384,704
[45] May 24, 1983

[54] CARGO VALVE

[76] Inventor: Robert C. Wolff, 955 Crystal, New Orleans, La. 70124

[21] Appl. No.: 157,192

[22] Filed: Jun. 6, 1980

Related U.S. Application Data

[60] Continuation-in-part of Ser. No. 469,807, May 14, 1974, abandoned, which is a division of Ser. No. 411,848, Nov. 1, 1973, Pat. No. 3,883,269.

[51] Int. Cl.³ .......................................... F16K 51/00
[52] U.S. Cl. ................................. 251/144; 251/267
[58] Field of Search ............................... 251/144, 267

[56] References Cited

U.S. PATENT DOCUMENTS

| | | | |
|---|---|---|---|
| 1,894,830 | 1/1933 | Peterson | 251/144 X |
| 2,139,280 | 12/1938 | McBride | 251/144 |
| 2,190,723 | 2/1940 | McBride | 251/144 |
| 2,789,579 | 4/1957 | Kowaski | 251/144 X |
| 3,828,819 | 8/1974 | Brogren | 251/144 X |

FOREIGN PATENT DOCUMENTS 2549426  5/1976  Fed. Rep. of Germany ...... 251/144

Primary Examiner—A. Michael Chambers
Attorney, Agent, or Firm—Charles C. Garvey

[57] ABSTRACT

The present invention provides a cargo valve mounted upon a horizontal bulkhead having a discharge opening. A vertically disposed preferably cylindrical valve housing is mounted on the bulkhead above the opening and a plurality of support plates mounted at their respective end portions to the bulkhead and to the valve body. The plates support the body a distance above the opening allowing fluid of slurry flow to enter the discharge opening between the bulkhead and the valve body. A preferably cylindrical valve piston is slidably mounted within the valve body housing between upper open and lower closed positions. The valve piston provides a lower preferably circular valve seat conforming to the circular discharge opening which has a diameter preferably greater than the diameter of the opening which allows for the sealing thereof. A seal is provided at the lower circular edge of the seat and forms a closure of the discharge opening when the valve piston is in its lower closed position. An operator in the form of preferably a hand wheel mounted on deck for example of a barge is provided for moving the piston within the valve body between upper open and the lower closed positions.

19 Claims, 5 Drawing Figures

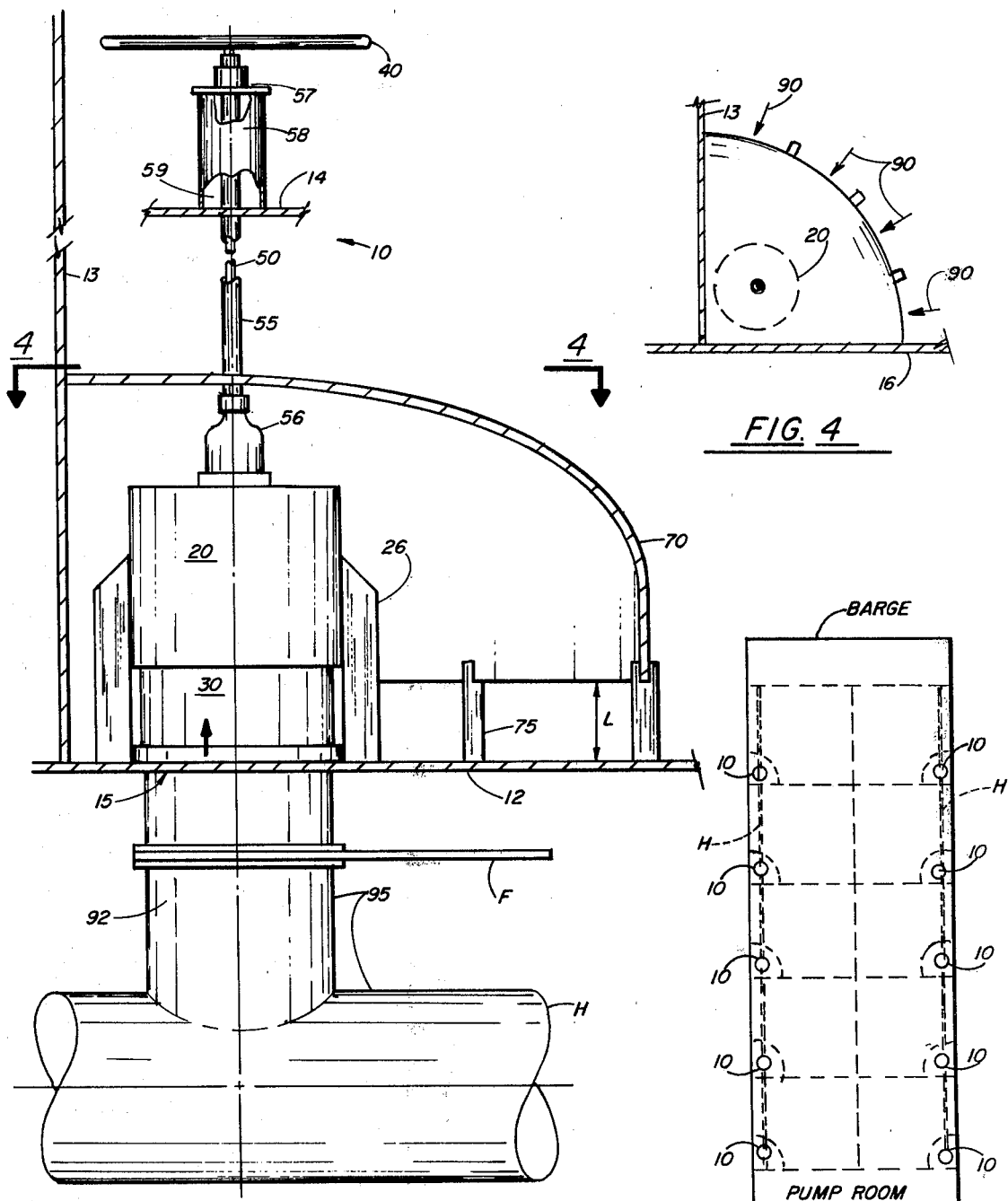

CARGO VALVE

REFERENCE TO RELATED APPLICATION

This is a continuation in part of U.S. application Ser. No. 469,807 filed May 14, 1974 which was a division of U.S. application Ser. No. 411,848, filed Nov. 1, 1973, now issued as U.S. Pat. No. 3,883,269. U.S. application Ser. No. 469,807 is presently abandoned, but a Supplemental Petition to Revive it is being filed.

BACKGROUND OF THE INVENTION

1. Field of the Invention

The present invention relates to valves and more particularly relates to cargo valves as used between horizontal bulkheads on for example barges.

2. General Background and Prior Art

There is presently existing in this country a severe energy crisis which is due in part to the ever increasing rise in the cost of sources of energy such as fossil fuels, oil, gas and the like.

An apparent future solution to at least a portion of this problem is the use of coal as a source of energy.

Coal can be transmitted through pipe-lines when it is shipped in the form of a slurry (i.e. mixed with a liquid such as water for example). Such slurries can loaded dry be pumped through a pipe-line much in the same way as any other liquid material. This will allow the transmission of coal and ores from central United States and western sites to eastern and southern electrical plants and refineries.

Barges can also be used for the transportation of dry bulk materials which will be loaded dry through chutes or by conveyor and then fluidized by air to be discharged. Included in this group are several grain products for example.

The pumping of slurry materials using pneumatic pumping is discussed in my prior patent U.S. Pat. No. 3,883,269 issued May 13, 1975 and entitled "Liquid Transfer System".

One of the problems in the pumping of slurried materials is the wear which is experienced by the pump itself and any inner working parts. The same abrasion problem exists in the inner workings of valves which are used to control the flow of slurried materials during transfer to an from barges and the like.

Many cargo pumps have been patented. Some prior art patents of which I am aware are below discussed.

A cargo or gate valve for hopper cars or the like is seen in U.S. Pat. No. 3,556,469. In that patent there is provided a hand wheel which operates a vertical shaft attached at its lower end portion to a pyramid shaped valving member. The valving member opens and closes a lower discharge opening. Guide rods are provided to insure that the pyramid valve member will not be permitted to rotate during operation of the gate valve.

A valve for controlling the discharge of plastic or semi-solid material particularly from tank mixers and the like is seen in U.S. Pat. No. 1,681,209.

A loading and unloading valve adapted to be mounted in the bottom of a tank is seen in U.S. Pat. No. 4,194,523. A valve sealing a lower outlet opening in a tank for example is seen in U.S. Pat. No. 4,176,821.

U.S. Pat. No. 4,011,885 shows a manifold valve structure for use with a multi-compartmented transportation tank for liquids, such as for instance a mobile gasoline or oil transportation tank. The valve is actuated by means of a hand wheel which rises an elongated vertical stem and an associated valve disc with the disc being raised to a desired elevation.

The prior art type valves suffer in that do not provide a simple and economical means for the discharge of fluid such as slurries, bulk cargo and the like from tanks through a lower horizontal gravity flow discharge opening.

One problem in the control of bulk cargo and abrasive cargo such as slurries, grain, and the like is that abrasion and wear and friction is much greater than with liquid cargo. Thus, prior art type valves which are exposed to the discharge stream are prematurely worn out. Many gate valves and like controllers are ineffective in controlling the discharge of bulk materials from tanks because the discharge area is too highly restrictive and a less than optimum flow rate is seen. Many prior art type valves are complex and expensive to manufacture and difficult to maintain.

A further problem in the control of discharge flow from tanks especially in the discharge of slurry materials, viscous materials, grain and the like is the precise control of the quantity of flow which leaves the tank. In a multi-tank vessel such as a barge for example, it is desirable to discharge the tanks in a sequence which insures a proper head on the discharge flow lines at all times.

GENERAL DISCUSSION OF THE PRESENT INVENTION

The present invention solves these prior art problems by providing a cargo valve which easily and precisely handles the controlling of slurry material with a minimum amount of abrasion being experienced by the valving portions of the valve itself.

Thus, it is an object of the present invention to provide a multi-purpose valve for controlling the flow of slurries such as coal slurries and the like, as well as to provide a valve for controlling flowable liquid materials regardless of viscosity.

It is another object of the present invention to provide a valve which can be mounted for example upon a horizontal bulkhead in for example a barge for controlling the flow of fluid through the horizontal bulkhead.

Another object of the present invention is to provide a cargo valve which allows controllable maximum or desired fluid flow through the valve with minimum restrictions.

It is another object of the present invention to provide a cargo valve which maximizes the flow of thick materials such as oil, slurries and the like through the valve while minimizing damage to the valve in the form of abrasion and wear.

Still another object of the present invention is to provide a valve apparatus which is easy to construct, easy to maintain, and easy to open or close whenever desired.

A further object of the present invention is to provide a protective valve apparatus which controls encroachment of grandular cargo on the movable valve piston by providing a radius clearance and vertical clearance in conjunction with the cargo's natural angle of repose in the dry state. A feature of the protective valve apparatus of the present invention is that upon fluidizing the cargo, the natural angle of repose reduces to zero allowing for the flow to proceed under the protective quadrant shroud and through the horizontal bulkhead opening.

Another object of the present invention is to provide a valve apparatus for controlling discharge of bulk, granular, slurry or liquid cargoes from tanks wherein valve moving parts are protectively housed and friction thereon is reduced, both increasing valve life and ease of operation.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein:

FIG. 3 is a top sectional view of the preferred embodiment of the apparatus of the present invention;

FIG. 4 is a top sectional view of the preferred embodiment of the apparatus of the present invention;

FIG. 5 is a schematic view of a cargo vessel, as a barge wherein the valve apparatus of the present invention would be useful as a cargo valve.

DETAILED DESCRIPTION OF THE PREFERRED EMBODIMENT

Figure 1:
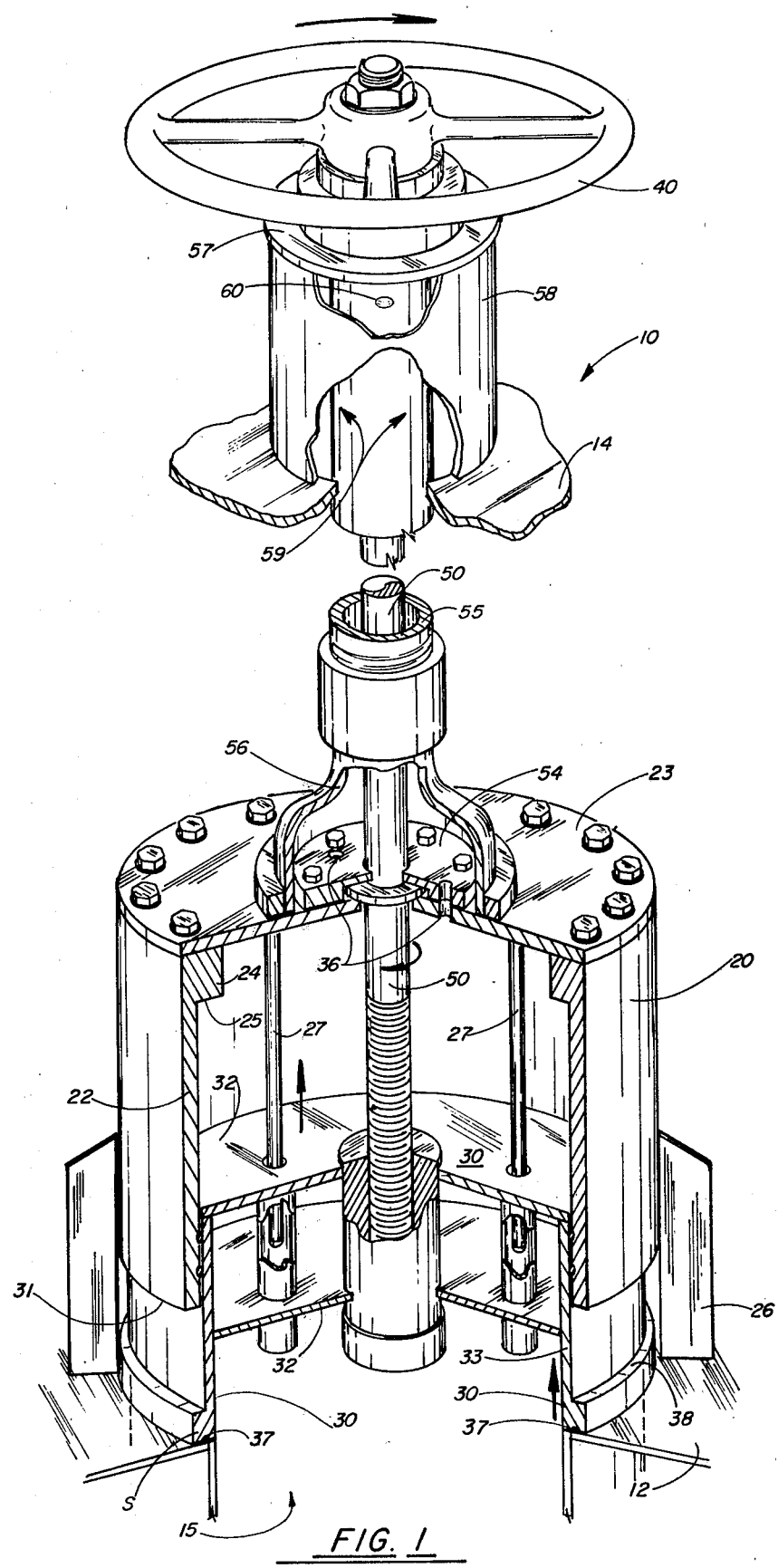
FIG. 1 is a perspective cut-away view of the preferred embodiment of the apparatus of the present invention.
Figure 2:
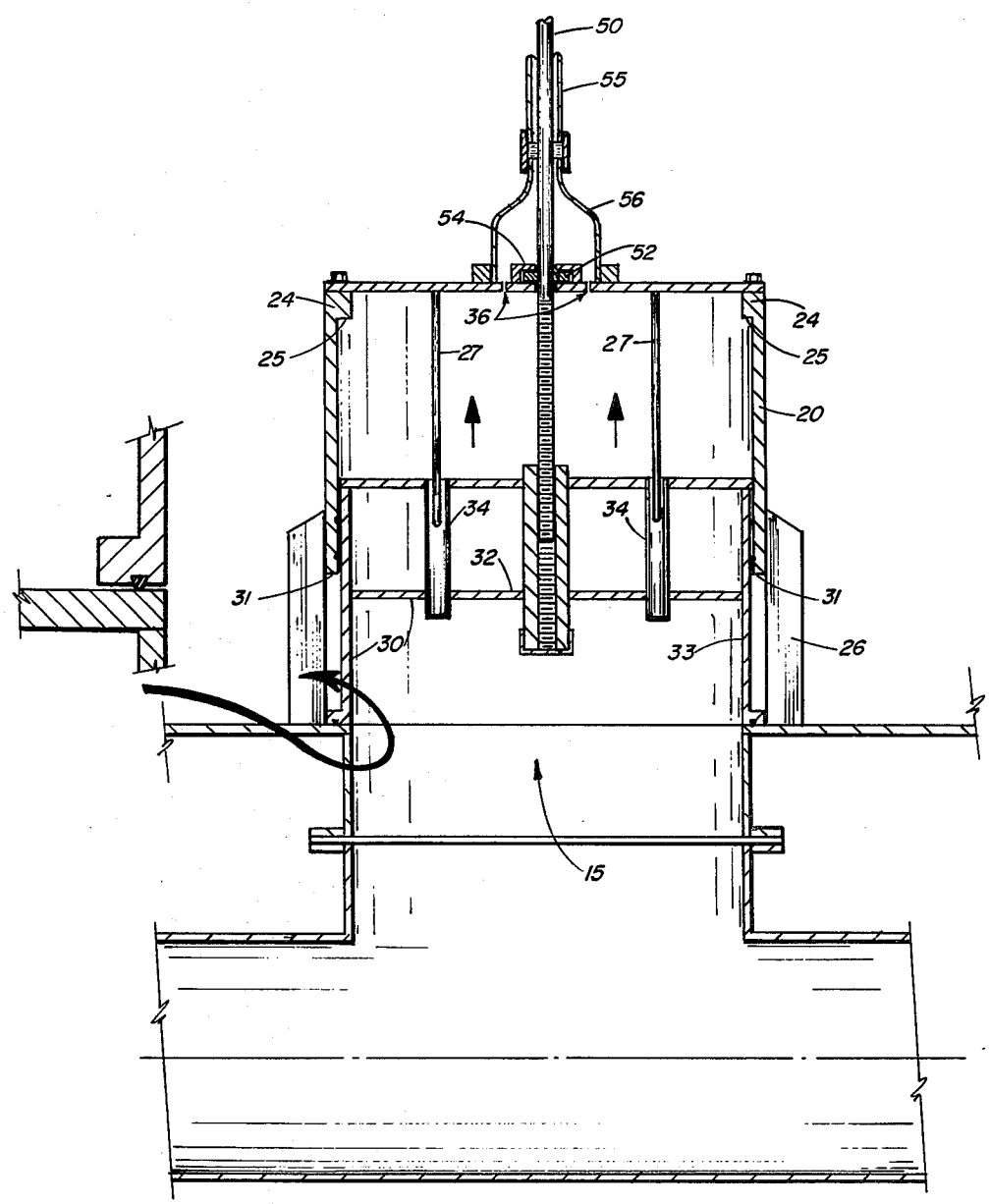
FIG. 2 is a partial sectional view of the preferred embodiment of the apparatus of the present invention.

FIGS. 1, 2 and 3 best show the preferred embodiment of the apparatus of the present invention designated generally by the numeral 10. Cargo valve 10 as shown in FIGS. 1-3 is mounted upon cargo tank bottom 12 between tank bottom 12 and upper deck or tank top or deck 14, preferably adjacent vertical tank wall or bulkhead 13 and generally above a preferably circular discharge opening 15 formed in tank bottom 12.

Valve 10 provides a housing 20 which is preferably cylindrical having mounted there within a corresponding cylindrical piston 30 which is operated between open and closed positions by for example hand wheel assembly 40 which is affixed to a vertical shaft 50 having connections to piston 30 as will be described more fully hereinafter.

Housing 20 is supported by a plurality of substantially flat support plates 26 which support housing 20 above opening 15 allowing fluid to flow freely into discharge 15 under the influence of gravity when piston 30 is in its upper open position as will be described more fully hereinafter.

Housing 20 is preferably cylindrical having a cylindrical sidewall 22 and circular top plate 23. Top plate 23 would be affixed for example by bolting or like means to sidewall 22. The uppermost portion of sidewall 22 would provide an inner annular shoulder portion 24 which forms a stop 25 limiting the upper movement of piston 30 within housing 20.

Piston 30 as best seen in FIGS. 1 and 2 is likewise cylindrical and is of an outer diameter substantially equal to the inner diameter of housing 20. Piston 30 could be provided with an upper support plate 32 which would be welded for example to cylindrical sidewall 33 of piston 30.

A pair of guides 34 which could be in the form of for example cylindrical sleeves would cooperate with pins 27 mounted in top plate 23 of housing 20. Guides 34 would slideably move over pins 27 preventing the rotation of piston 30 within valve housing 20 during operation of piston 30 by shaft 50.

The lower edge portion of piston 30 provides an annular valve seat "S" which could be provided with an O-ring or like sealing material designated by the numeral 37.

An annular shoulder 38 forming seat "S" provides a stop which limits the upper movement of piston 30 into housing 20. Stop 38 would abut the lower edge 31 of housing 20 simultaneously when the upper plate 32 of piston 30 abuts stop 25 thus insuring a positive limitation upon the upward movement of piston 30 within housing 20.

Operation of piston 30 within housing 20 would be possible by rotation of handwheel assembly 40 (see curved arrow in FIG. 1) which is affixed to and rotates shaft 50, thereby raising or lowering, as desired, piston 30. (See straight arrow in FIG. 1).

Shaft 50 would be provided with a for example cylindrical collar 52 which would move within a similarly shaped recess provided within bearing 54.

A shaft housing 55 is provided for encapsulating shaft 50 and bearing 54. Shaft housing 55 would extend between upper deck or tank top 14 and housing 20 would at its lower end portion provide a swaged fitting 56 portion which would be concentrically enlarged so as to encapsulate bearing 54 as well as shaft 50.

Shaft housing 55 insures protection of shaft 50 from bulk cargoes or slurry cargoes such as grain or coal. Thus, friction with such a solid or bulk cargo or slurry cargo is eliminated as shaft housing 55 provides an insulation between the cargo and shaft.

Above deck or tank top 14, housing 55 is somewhat enlarged providing chamber 58. The lowermost portion of chamber 58 is open ended cooperating with a similarly sized opening in deck or top tank top 14.

A port 60 provided in housing 55 allows fluid and/or gases which might enter the space between housing 55 and shaft 50 to be discharged back into the cargo tank as the valve is operated. Thus, when valve piston 30 rises forcing any fluid trapped above upper plate 32 to move through ports 36 into housing 55, such fluids will eventually be discharged through port 60 into the inner space 59 between chamber 58 and housing 55. Such fluid would then fall back through the provided opening in deck or tank top 14 which communicates with chamber 58 falling back into the cargo tank area.

Valve housing 20 could be protected by shroud 70 which could be for example a one-quarter (¼) dish head 70 as best seen in FIG. 3. In the preferred embodiment, shroud 70 would be welded or affixed by other suitable means to vertical tank walls or bulkheads 13, 16 and would be supported above horizontal bulkhead 12 by a plurality of gussets 75 a distance L above bulkhead 12 as best seen in FIG. 1.

The distance L as shown in FIG. 3 could be set dependent upon the angle of repose of the fluid or slurry or grain material being pumped. In this manner, heavy, viscous, or slurry materials would enter discharge opening 15 depending on their angle or repose in such a fashion as not to contact valve seat 36 thus maintaining its integrity when it is in the upper or open position of FIG. 3.

Shroud or dish head 70 as constructed would allow the angle of repose of any bulk cargo being discharged to be controlled in such a manner as to prevent the abrasive and frictional contact of bulk cargo such as coal, grain or the like with piston 30.

Cargoes intended to be pumped out as slurries would be loaded in the dry form through chutes for example into the tanks. Thus, no lost dead weight would be had due to water.

In FIG. 4, arrows 90 schematically show the placement for example of air jets to fluidize cargo such as grain. During discharge, such air jets would be also located in header H to enhance the flow of grain therethrough.

In FIG. 3, header H is shown as forming a T-connection designated by the numeral 95. A flange F could be inserted in discharge line 92 for preventing a discharge of fluids from valve 10 and its particular tank if desired.

Because many varying and different embodiments may be made within the scope of the inventive concept herein taught, and because many modifications may be made in the embodiments of the law, it is to be understood that the details herein are to be interpreted as illustrative and not in a limiting sense.

What is claimed as invention is:

1. A cargo tank valve for valving horizontal deck openings comprising:
   a. a vertically disposed cylindrical valve housing mounted above the deck opening to be valved and comprising a circular top connected at its edge portion to a cylindrical sidewall and being open ended at its lower downwardly facing end defining therewithin a housing interior;
   b. a hollow cylindrical piston valving member comprising a cylindrical piston comprising a curved sidewall and means closing the hollow in said piston, said piston being slideably mounted within said cylindrical valve housing for sliding movement between open flow and closed flow positions, the lower end face of the hollow cylinder providing an annular valve seat, said seat being positioned downwardly to seat against the deck around the opening being valved, said piston valving member being of corresponding section to said valve housing interior and disposed at least in part therewithin thereby forming (1) a closure to the open end portion of said valve housing and (2) a continuous circumferential seal with the interior cylindrical surface of said valve housing in both open flow and closed flow positions;
   c. attachment means for supporting said valve body above the deck opening to be valved, said means allowing substantially 360° radially unobstructed flow into the opening to be valved between said seat and the opening;
   d. vertical operator shaft means extending through said housing and attached at one end portion to said cylindrical piston plate for operating said valving member between open flow and closed flow positions; and
   e. shaft housing means for encapsulating said shaft at said circular top.

2. The cargo valve of claim 1 further comprising guide means for preventing rotation of said valve member within said housing.

3. The cargo tank valve of claim 1 wherein said shaft means is a rotatable vertical shaft.

4. The cargo tank valve of claim 3 wherein said shaft is threadably engaged at its lower end portion to said piston and there is further provided thrust bearing means for preventing vertical movement of said shaft with respect to said housing.

5. The cargo tank valve of claim 1 wherein said valving member is at least partially contained within said housing when in both said open flow and said closed flow positions.

6. The cargo tank valve of claim 1 further coprising stop means carried by said valving member for defining the maximum inward movement of said valving member into said housing, said stop means comprising at least in part said annular valve seat.

7. The cargo tank valve of claim 6 wherein said annular valve seat provides an annular shoulder projecting radially beyond the cylindrical wall portion of said valving member piston.

8. The cargo tank valve of claim 1 wherein said attachment means comprises a plurality of radially spaced support members affixed at their end portions respectively to said deck and to said housing supporting said housing above said opening.

9. The cargo tank valve of claim 8 wherein said support members are a plurality of gussets radially placed about said housing, each plate being generally coaxial with a radius of said housing.

10. A cargo valve for valving horizontal deck openings comprising:
    a. a vertically disposed cylindrical valve housing mounted above the deck opening to be valved and comprising a circular top connected at its edge portion to a cylindrical sidewall and being open ended at its lower downwardly facing end defining therewithin a housing interior;
    b. a plurality of support plates mounted at their respective end portions to the deck and to said valve body, said support plates supporting said body a distance above said opening and allowing substantially 360° fluid flow by gravity to enter the opening to be valved between said valve body and the deck;
    c. a hollow cylindrical valve piston slideably mounted within said valve housing between upper "open" and lower "closed" positions and comprising a curved sidewall and means closing the hollow in said piston;
    d. a lower annular valve seat mounted at the lower end face portion of the valve piston, said seat being positioned downwardly to seal against the deck around the opening being valved, said valve piston being of corresponding section to said valve housing interior and disposed at least in part therewithin thereby forming (1) a closure to the open end portion of said valve housing and (2) a continuous circumferential seal with the interior cylindrical surface of said valve housing in both open flow and closed flow positions;
    e. operator means for moving said piston within said valve body between said upper "open" and said lower "closed" positions.

11. The cargo valve of claim 10 wherein said deck is the bottom of a cargo tank.

12. The cargo valve of claim 10 wherein said opening is circular.

13. The cargo valve of claim 10 wherein said valve housing is cylindrical and open ended at its lower end portion, having an inner diameter substantially equal to the external diameter of said valving member.

14. The cargo valve of claim 10 wherein said support plates are generally flat gusset plates mounted on said deck and attached at their upper end portion to said valve body, each of said gusset plates being radially placed on axial lines substantially intersecting the center of said cylindrical valve housing.

15. The cargo valve of claim 10 wherein said valve piston is cylindrical.

16. The cargo valve of claim 10 wherein said valve piston is cylindrical and provides at its lower end portion an annular valve seat which provides a radially projecting annular shoulder, said shoulder defining a stop for limiting the inward movement of said valve piston into said housing.

17. The cargo valve of claim 10 wherein said seal means comprises at least in part an annular resilient insert projecting continuously from the lowermost surface of said seat.

18. The cargo valve of claim 10 wherein said operator means comprises a vertically arranged reach rod shaft being threadably attached at its lowermost portion to said valve piston, and there is further provided thrust bearing means on said housing for preventing vertical movement of said shaft with respect to said housing.

19. The cargo valve of claim 10 further comprising guide means for preventing rotational movement of said valve piston with respect to the housing.

* * * * *